United States Patent Office.

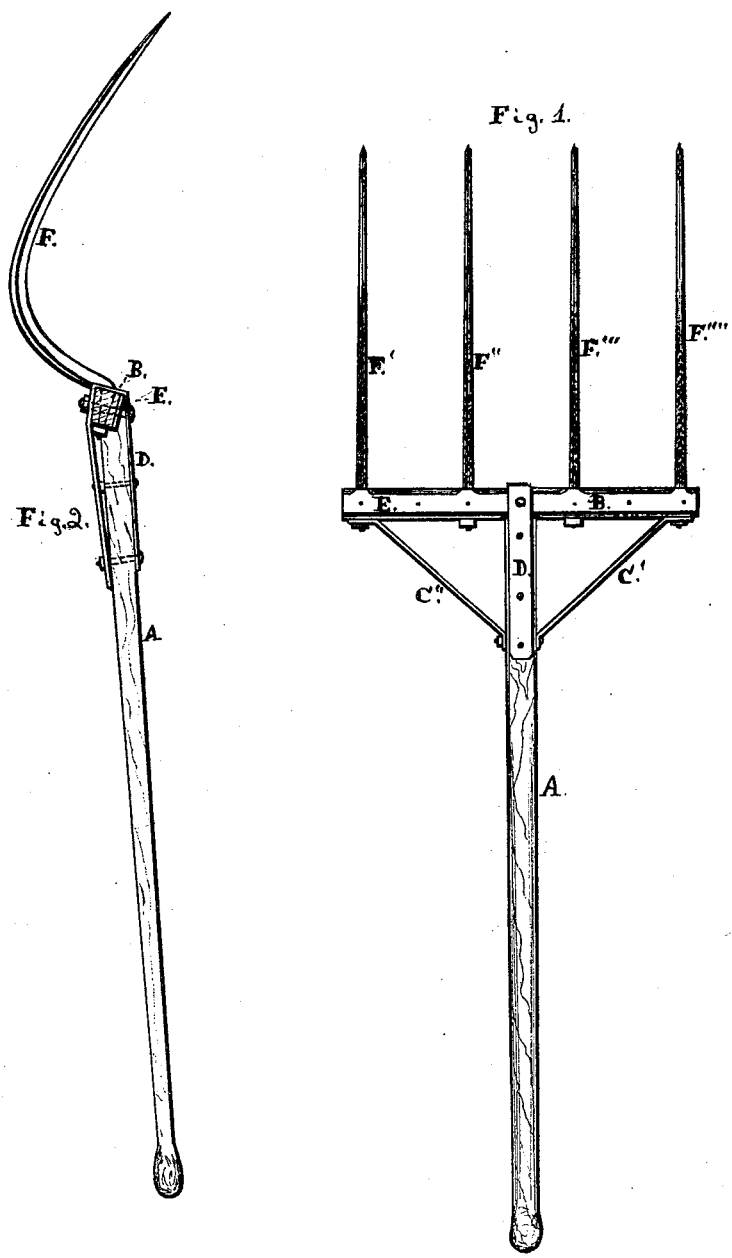

THOMAS R. GEORGE, OF WEST DRYDEN, NEW YORK.

Letters Patent No. 96,794, dated November 16, 1869.

IMPROVEMENT IN GAVEL-FORKS.

The Schedule referred to in these Letters Patent and making part of the same.

To all whom it may concern:

Be it known that I, THOMAS R. GEORGE, of West Dryden, Tompkins county, New York, have invented an Improved Gavel-Fork; and I do hereby declare that the following is a full and exact description thereof.

Figure 1 is a view, looking down on the concave front of the fork.

Figure 2 is a side and partially sectional view, further showing the construction thereof.

My object is mainly to improve the forks used in barley and in gavels, by giving them broad head-pieces, straight, but deeply-concave tines, an angular set of the handle to the head, a firm fixture of the tines in the head, by an angle at the point of junction, and by the combined arrangement and construction of the whole.

The modes by which I accomplish this are seen, as I describe my fork.

In fig. 1, A is the handle, B the head, which are braced by the rods C' C", and strapped by the metal band D, and the head is strengthened by the metal cap E; and F', F", F''', and F'''' are the tines, inserted through the head, with a sharp angle next to the head, and with a deep concavity next succeeding, and a point nearly straight. The band D acts as a brace in the rear.

In fig. 2, the same facts are seen.

The uses and advantages of my fork are apparent to those skilled in the art to which it appertains.

Claims.

1. The combination and arrangement of a gavel-fork, formed by the concave tines F, their angular bend at and resting on the head B, horizontal insertion in and through the head B, the broad head B, the handle A, set obliquely to the head B, and banded to the same by the strap D, substantially as set forth.

2. The combined whole, formed of the handle A, the broad head B, the braces C' C", the metallic cap E, the band D, the angled and concave tines F, the same arranged as and for the purpose set forth.

THOMAS R. GEORGE.

Witnesses:
SAMUEL J. PARKER,
JOHN G. KIMBERLIN.